United States Patent
Bush et al.

(10) Patent No.: US 11,327,506 B2
(45) Date of Patent: May 10, 2022

(54) METHOD AND SYSTEM FOR LOCALIZED TRAVEL LANE PERCEPTION

(71) Applicant: GM GLOBAL TECHNOLOGY OPERATIONS LLC, Detroit, MI (US)

(72) Inventors: Lawrence A. Bush, Shelby Township, MI (US); Brent N. Bacchus, Sterling Heights, MI (US); James P. Neville, Detroit, MI (US); Upali P. Mudalige, Dakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 16/689,672

(22) Filed: Nov. 20, 2019

(65) Prior Publication Data

US 2021/0149415 A1 May 20, 2021

(51) Int. Cl.
*G05D 1/02* (2020.01)
*G01C 21/30* (2006.01)

(52) U.S. Cl.
CPC ........... *G05D 1/0278* (2013.01); *G01C 21/30* (2013.01); *G05D 1/0221* (2013.01); *G05D 1/0246* (2013.01)

(58) Field of Classification Search
CPC .. G05D 1/0278; G05D 1/0221; G05D 1/0246; G01C 21/30; G01C 21/3602; G01C 21/3658; G06K 9/00798
See application file for complete search history.

(56) References Cited

U.S. PATENT DOCUMENTS

| | | | |
|---|---|---|---|
| 2014/0233010 A1* | 8/2014 | Baldwin ................. | G01S 17/89 356/4.01 |
| 2016/0368505 A1* | 12/2016 | Sorstedt ............... | G05D 1/0088 |
| 2020/0005068 A1* | 1/2020 | Ozog ..................... | G06V 10/44 |
| 2020/0271473 A1* | 8/2020 | Wang ................. | G01C 21/3602 |
| 2021/0364320 A1* | 11/2021 | Mennen .................... | G06T 7/75 |

* cited by examiner

*Primary Examiner* — Aaron L Troost

(74) *Attorney, Agent, or Firm* — Quinn IP Law

(57) ABSTRACT

A system and method for monitoring a road segment includes determining a geographic position of a vehicle in context of a digitized roadway map. A perceived point cloud and a mapped point cloud associated with the road segment are determined. An error vector is determined based upon a transformation between the mapped point cloud and the perceived point cloud. A first confidence interval is derived from a Gaussian process that is composed from past observations. A second confidence interval associated with a longitudinal dimension and a third confidence interval associated with a lateral dimension are determined based upon the mapped point cloud and the perceived point cloud. A Kalman filter analysis is executed to dynamically determine a position of the vehicle relative to the roadway map based upon the error vector, the first confidence interval, the second confidence interval, and the third confidence interval.

18 Claims, 4 Drawing Sheets

METHOD AND SYSTEM FOR LOCALIZED TRAVEL LANE PERCEPTION

INTRODUCTION

Vehicles, including non-autonomous, semi-autonomous and autonomous vehicles, may make use of mapping information to inform an operator via a navigation and/or direct operational control of one or more components of an advanced driver assistance system (ADAS) or an autonomous vehicle system. Such mapping information may be in the form of a digitized map of a roadway system. Digitized maps of roadway systems may be generated based on data obtained from survey vehicles that traverse the road network and capture relevant data, and by other methods. Such maps may have localized inaccuracies. In addition, portions of such maps may become out-of-date due to road repair events, road construction, and other changes to the road network.

Accordingly, it is desirable to perceive a portion of a roadway in real-time to determine a ground truth, which may be compared with a digitized map to correct or otherwise update the digitized map, determine the position of the vehicle on the roadway, and to enhance operation of navigation systems and ADAS/autonomous vehicle systems.

SUMMARY

A system for a vehicle operating on a roadway is described, and includes a spatial sensor, a GPS sensor, a navigation system, and a controller. The spatial sensor is arranged to monitor a road segment of the roadway proximal to the vehicle. A memory device including a digitized roadway map is also included. The controller is in communication with the spatial sensor, the GPS sensor, the navigation system, and the memory device. The controller includes an instruction set that is executable to determine, via the GPS sensor, a geographic position of the vehicle in context of the roadway map and monitor, via the spatial sensor, the road segment. A perceived point cloud including a sensed edge for the road segment based upon the spatial sensor and a mapped point cloud including a mapped edge for the road segment based upon the digitized roadway map are determined. An error vector is determined based upon a transformation between the mapped point cloud and the perceived point cloud, and a first confidence interval associated with the error vector is also determined. The first confidence interval is derived from a Gaussian process that is composed from past observations of error in a lane edge of the road segment. A second confidence interval associated with a longitudinal dimension based upon the mapped point cloud and the perceived point cloud is determined, and a third confidence interval associated with a lateral dimension based upon the mapped point cloud and the perceived point cloud is determined. A Kalman filter analysis is executed to dynamically determine the position of the vehicle relative to the digitized roadway map based upon the error vector, the first confidence interval, the second confidence interval, and the third confidence interval. Operation of the vehicle is controlled based upon the position of the vehicle relative to the digitized roadway map. The Gaussian process is employed to update the digitized roadway map offline.

An aspect of the disclosure includes the instruction set being executable to execute a discounted distance iterative closest point (ICP) analysis of the mapped point cloud and the perceived point cloud in an unperturbed state to determine the transformation between the mapped point cloud and the perceived point cloud for the road segment. The transformation is also referred to as an error vector. A Gaussian Process is queried to determine the first confidence interval associated with the error vector and the location of the vehicle.

Another aspect of the disclosure includes the instruction set being executable to execute a perturbed sensitivity analysis of the mapped point cloud and the perceived point cloud to determine the second confidence interval associated with the longitudinal dimension based upon the mapped point cloud and the perceived point cloud and to determine the third confidence interval associated with the lateral dimension based upon the mapped point cloud and the perceived point cloud.

Another aspect of the disclosure includes the instruction set being executable to execute the perturbed sensitivity analysis of the mapped point cloud and the perceived point cloud by inducing an x-dimension perturbation of the perceived point cloud to determine the second confidence interval associated with the longitudinal dimension.

Another aspect of the disclosure includes the instruction set being executable to execute the perturbed sensitivity analysis of the mapped point cloud and the perceived point cloud by inducing a y-dimension perturbation of the perceived point cloud to determine the third confidence interval associated with the lateral dimension.

Another aspect of the disclosure includes the instruction set being executable to update the roadway map for the road segment based upon the error vector.

Another aspect of the disclosure includes the spatial sensor being a digital camera that is arranged to monitor a road segment of the roadway proximal to and forward of the vehicle.

Another aspect of the disclosure includes the spatial sensor being one of a radar sensor or a lidar sensor that is arranged to monitor a road segment of the roadway proximal to and forward of the vehicle.

Another aspect of the disclosure includes an advanced driver assistance system (ADAS), wherein the instruction set is executable to control a driving automation state associated with the ADAS based upon the position of the vehicle relative to the roadway map.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity, directional terms such as longitudinal, lateral, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" refers to mechanical and electrical hardware, software, firmware, electronic control components, processing logic, and/or processor devices, individually or in combination, that provide the described functionality. This may include, without limitation, an application specific integrated circuit (ASIC), an electronic circuit, a processor (shared, dedicated, or group) that executes one or more software or firmware programs, memory to contain software or firmware instructions, a combinational logic circuit, and/or other components.

Figure 1:
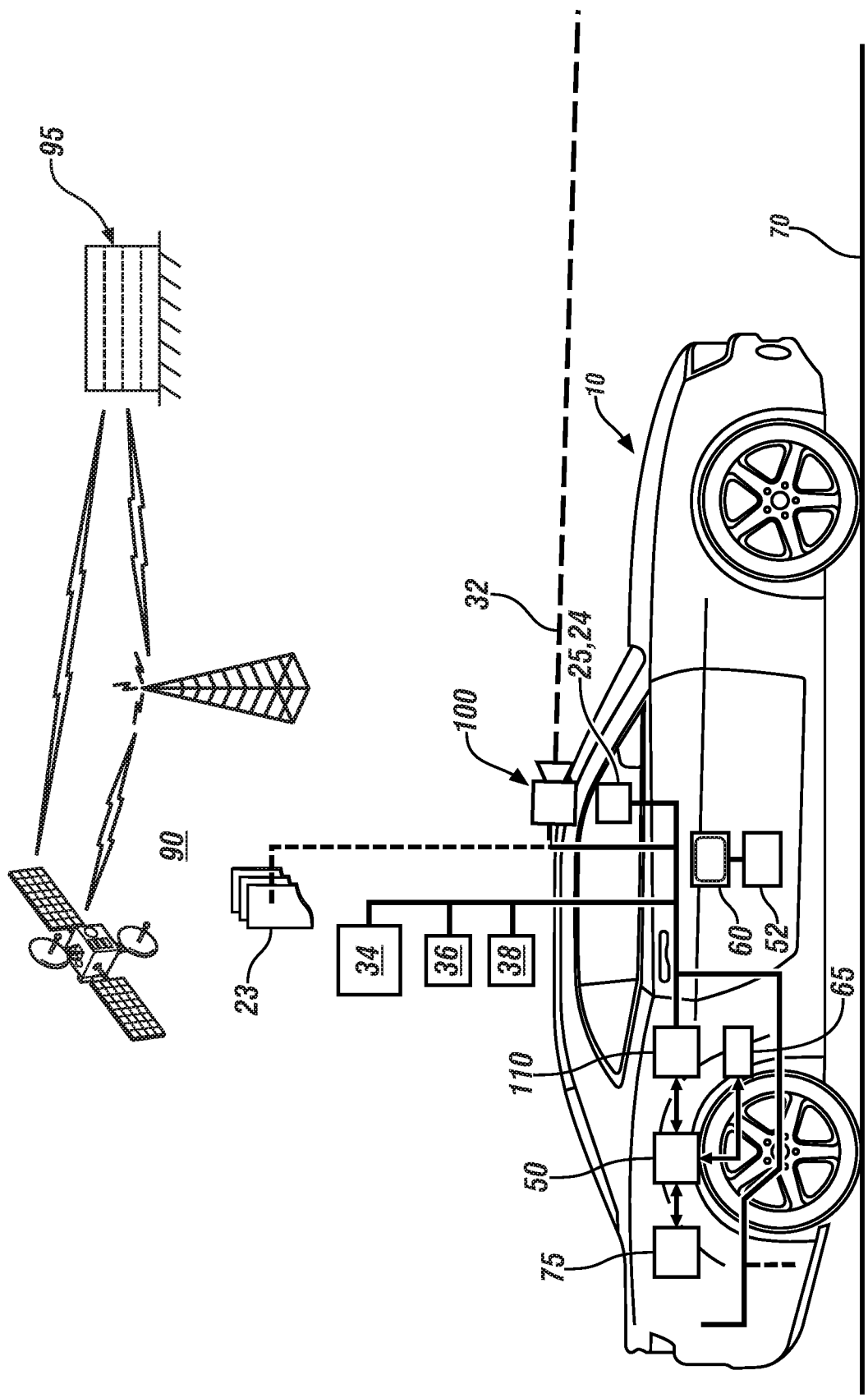
FIG. 1 schematically illustrates a side-view of a vehicle that is disposed on and able to traverse a travel surface such as a paved road surface in accordance with the disclosure.

Referring to the drawings, wherein like reference numerals correspond to like or similar components throughout the several Figures, FIG. 1, consistent with embodiments disclosed herein, schematically illustrates a side-view of a vehicle 10 that is disposed on and able to traverse a travel surface 70 such as a paved road surface. The vehicle 10 includes an on-board navigation system 24, a computer-readable storage device or media (memory) 23 that includes a digitized roadway map 25, a spatial monitoring system 100, a vehicle controller 50, a global positioning system (GPS) sensor 52, a human/machine interface (HMI) device 60, and in one embodiment an autonomous controller 65 and a telematics controller 75. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment, the spatial monitoring system 100 includes one or a plurality of spatial sensors and systems that are arranged to monitor a viewable region 32 that is forward of the vehicle 10, and a spatial monitoring controller 110. The spatial sensors that are arranged to monitor the viewable region 32 forward of the vehicle 10 include, e.g., a lidar sensor 34, a radar sensor 36, a digital camera 38, etc. Each of the spatial sensors is disposed on-vehicle to monitor all or a portion of the viewable region 32 to detect proximate remote objects such as road features, lane markers, buildings, pedestrians, road signs, traffic control lights and signs, other vehicles, and geographic features that are proximal to the vehicle 10. The spatial monitoring controller 110 generates digital representations of the viewable region 32 based upon data inputs from the spatial sensors. The spatial monitoring controller 110 can evaluate inputs from the spatial sensors to determine a linear range, relative speed, and trajectory of the vehicle 10 in view of each proximate remote object. The spatial sensors can be located at various locations on the vehicle 10, including the front corners, rear corners, rear sides and mid-sides. The spatial sensors can include a front radar sensor and a camera in one embodiment, although the disclosure is not so limited. Placement of the spatial sensors permits the spatial monitoring controller 110 to monitor traffic flow including proximate vehicles, intersections, lane markers, and other objects around the vehicle 10. Data generated by the spatial monitoring controller 110 may be employed by a lane marker detection processor (not shown) to estimate the roadway. The spatial sensors of the vehicle spatial monitoring system 100 may include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more vehicle(s).

The lidar sensor 34 employs a pulsed and reflected laser beam to measure range or distance to an object. The radar sensor 36 employs radio waves to determine range, angle, and/or velocity of an object. The camera 38 includes an image sensor, lens, and a camera controller. The image sensor is an electro-optical device that converts an optical image into an electronic signal employing a multi-dimensional array of light-sensitive sensing elements. The camera controller is operatively connected to the image sensor to monitor the viewable region 32. The camera controller is arranged to control the image sensor to capture an image of a field of view (FOV) that is associated with the viewable region 32 that is projected onto the image sensor via the lens.

The optical lens may be configured to include features such as a pin-hole lens, a fisheye lens, a stereo lens, a telescopic lens, etc. The camera 38 periodically captures, via the image sensor, an image file associated with the viewable region 32 at a desired rate, e.g., 30 image files per second. Each image file is composed as a 2D or 3D pixelated digital representation of all or a portion of the viewable region 32 that is captured at an original resolution of the camera 38. In one embodiment, the image file is in the form of a 24-bit image including RGB (red-green-blue) visible light spectrum values and depth values that represent the viewable region 32. Other embodiments of the image file can include either a 2D or 3D image at some level of resolution depicting a black-and-white or a grayscale visible light spectrum representation of the viewable region 32, an infrared spectrum representation of the viewable region 32, or other image representations without limitation. The image representations of the plurality of image files can be evaluated for parameters related to brightness and/or luminance in one embodiment. Alternatively, the image representations may be evaluated based upon RGB color components, brightness, texture, contour, or combinations thereof. The image sensor communicates with an encoder, which executes digital signal processing (DSP) on each image file. The image sensor of the camera 38 may be configured to capture the image at a nominally standard-definition resolution, e.g., 640×480 pixels. Alternatively, the image sensor of the camera 38 may be configured to capture the image at a nominally high-definition resolution, e.g., 1440×1024 pixels, or at another suitable resolution. The image sensor of the camera 38 may capture still images, or alternatively, digital video images at a predetermined rate of image capture. The image files are communicated to the camera controller as encoded datafiles that are stored in a non-transitory digital data storage medium in one embodiment for on-board or off-board analysis.

The camera 38 is advantageously mounted and positioned on the vehicle 10 in a location that permits capturing images of the viewable region 32, wherein at least a portion of the viewable region 32 includes a portion of the travel surface 70 that is forward of the vehicle 10 and includes a trajectory of the vehicle 10. The viewable region 32 may also include a surrounding environment, including, e.g., vehicle traffic, roadside objects, pedestrians, and other features, the sky, a horizon, the lane of travel and on-coming traffic forward of the vehicle 10. Other cameras (not shown) may also be employed, including, e.g., a second camera that is disposed on a rear portion or a side portion of the vehicle 10 to monitor rearward of the vehicle 10 and one of the right or left sides of the vehicle 10.

The autonomous controller 65 is configured to implement autonomous driving or advanced driver assistance system (ADAS) vehicle functionalities. Such functionality may include an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle 10. Driving automation can include some level of automatic control or intervention related to simultaneous control of multiple vehicle functions, such as steering, acceleration, and/or braking, with the driver continuously having overall control of the vehicle 10. Driving automation can include simultaneous automatic control of vehicle driving functions that include steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle 10 for an entire trip. Driving automation includes hardware and controllers configured to monitor the spatial environment under various driving modes to perform various driving tasks during dynamic vehicle operation. Driving automation can include, by way of non-limiting examples, cruise control, adaptive cruise control, lane-change warning, intervention and control, automatic parking, acceleration, braking, and the like. The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. As such, the braking command can be generated by the autonomous controller 65 independently from an action by the vehicle operator and in response to an autonomous control function.

Operator controls may be included in the passenger compartment of the vehicle 10 and may include, by way of non-limiting examples, a steering wheel, an accelerator pedal, the brake pedal and an operator input device that is an element of the HMI device 60. The operator controls enable a vehicle operator to interact with and direct operation of the vehicle 10 in functioning to provide passenger transportation. The operator control devices including the steering wheel, accelerator pedal, brake pedal, transmission range selector and the like may be omitted in some embodiments of the vehicle 10.

The HMI device 60 provides for human/machine interaction, for purposes of directing operation of an infotainment system, the global positioning system (GPS) sensor 52, the navigation system 24 and the like, and includes a controller. The HMI device 60 monitors operator requests and provides information to the operator including status of vehicle systems, service and maintenance information. The HMI device 60 communicates with and/or controls operation of a plurality of operator interface devices, wherein the operator interface devices are capable of transmitting a message associated with operation of one of the autonomic vehicle control systems. The HMI device 60 may also communicate with one or more devices that monitor biometric data associated with the vehicle operator, including, e.g., eye gaze location, posture, and head position tracking, among others. The HMI device 60 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI device 60. The HUD may project information that is reflected onto an interior side of a windshield of the vehicle, in the field-of-view of the operator, including transmitting a confidence level associated with operating one of the autonomic vehicle control systems. The HUD may also provide augmented reality information, such as lane location, vehicle path, directional and/or navigational information, and the like.

The on-board navigation system 24 employs the digitized roadway map 25 for purposes of providing navigational support and information to a vehicle operator. The autonomous controller 65 employs the digitized roadway map 25 for purposes of controlling autonomous vehicle operation or ADAS vehicle functions.

The vehicle 10 may include a telematics controller 75, which includes a wireless telematics communication system capable of extra-vehicle communications, including communicating with a communication network 90 having wireless and wired communication capabilities. The telematics controller 75 is capable of extra-vehicle communications that includes short-range vehicle-to-vehicle (V2V) communication and/or vehicle-to-everything (V2x) communication, which may include communication with an infrastructure monitor, e.g., a traffic camera. Alternatively or in addition, the telematics controller 75 has a wireless telematics communication system capable of short-range wireless communication to a handheld device, e.g., a cell phone, a satellite phone or another telephonic device. In one embodiment the handheld device includes a software application that includes a wireless protocol to communicate with the telematics controller 75, and the handheld device executes the extra-vehicle communication, including communicating with an off-board server 95 via the communication network 90. Alternatively or in addition, the telematics controller 75 executes the extra-vehicle communication directly by communicating with the off-board server 95 via the communication network 90.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.), which are indicated by memory 23. The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
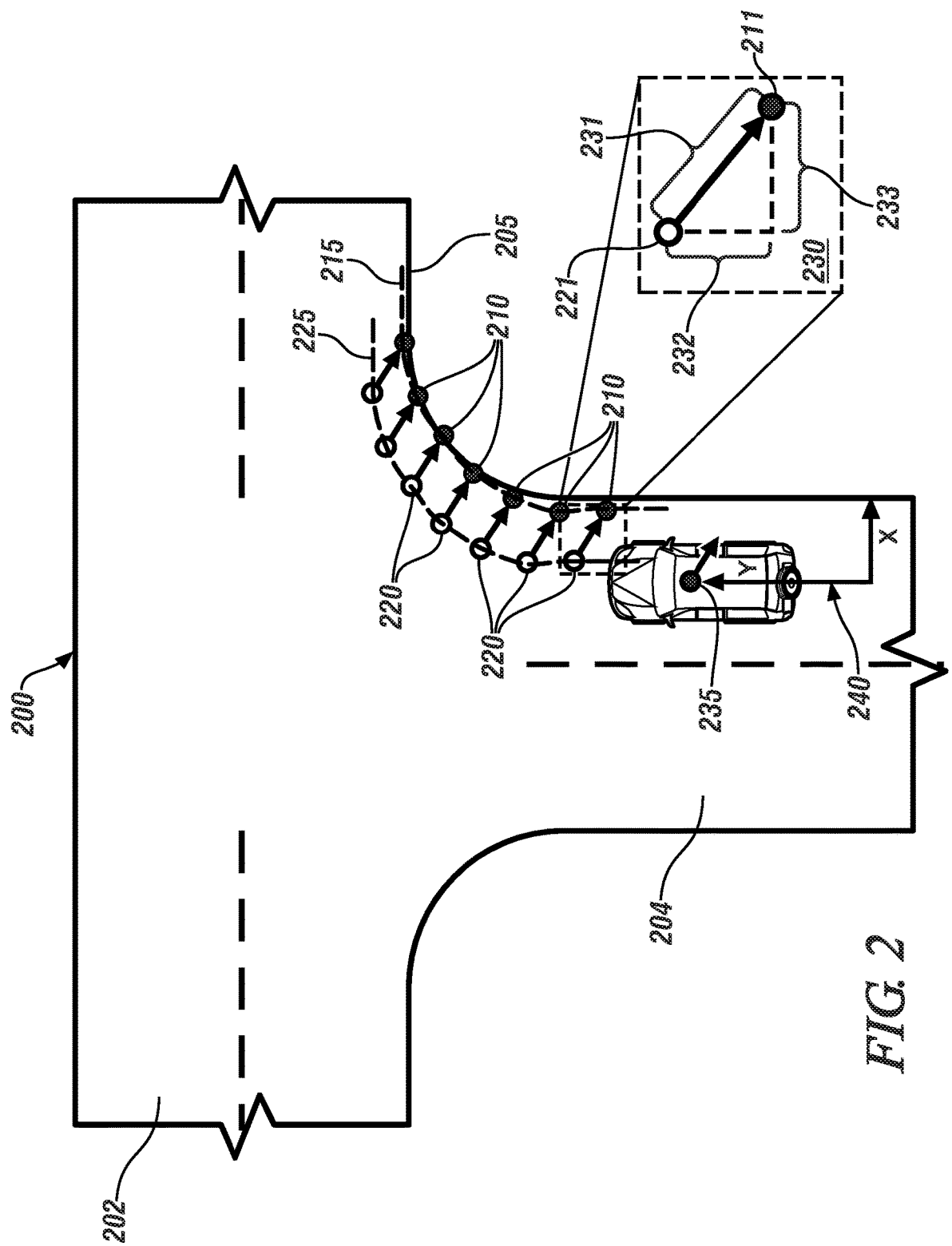
FIG. 2 pictorially shows a top view of a road segment, which may be a portion of the digitized roadway map that may be employed by an embodiment of the vehicle that is described with reference to FIG. 1, in accordance with the disclosure.

FIG. 2 schematically shows a top view of a road segment 200, which may be a portion of the digitized roadway map 25 that may be employed by an embodiment of the vehicle 10 that is described with reference to FIG. 1. An embodiment of the vehicle 10 is also shown. The example road segment 200 is a T-intersection including a main road element 202 and a side road element 204 that connects to the main road element 202 at a right angle. The example road segment 200 is depicted as a single lane in each direction of travel. However, the road segment 200 and the concepts associated therewith may be applied to road segments that are configured as multi-lane roads. The vehicle 10 is disposed on the side road element 204 approaching the main road element 202, as shown. An edge portion 205 of the road segment 200 is shown, representing a geophysical ground truth. A frame of reference 240 is shown, including a longitudinal direction (X) and a lateral direction (Y), which are defined in context of the orientation of the vehicle 10. A first set of points 210 are shown, and represent geophysical locations of a plurality of lane markers that are disposed at the edge portion 205 of the road segment 200 as perceived by one more of the spatial sensors of the vehicle spatial monitoring system 100. The first set of points 210 form a perceived point cloud associated with the road segment 200. A second set of points 220 represent map-based locations of the lane markers that are identified on the digitized roadway map 25, correspond to individual ones of the lane markers 210, and represent a map edge 225. The second set of points form a mapped point cloud that is associated with the road segment 200. A third point 235 represents a geophysical position of the vehicle 10, as indicated by the GPS sensor 52. As shown in insert 230, an error vector 231 can be identified, and represents a difference between the map-based location of one of the lane markers 220, indicated by 221, and the geophysical location of one of the lane markers 210, indicated by 211, including a transformation that is quantified in the longitudinal direction (X) 232 and the lateral direction (Y) 233.

The geophysical locations of the lane markers 210, represented by the map edge 225 of the road segment 200 and associated lane segment may be expressed by EQ. 1, as follows.

$$y = A + Bx + Cx^2 + Dx^3 \quad [1]$$

Parameters associated with EQ. 1 may be developed for the perceived point cloud formed by the first set of points 210 associated with the road segment 200. Parameters associated with EQ. 1 may also be developed for the mapped point cloud formed by the second set of points 220 associated with the road segment 200.

As described herein, a system and associated method are provided for real time vehicle positioning using lane perception inputs that are described using polynomial equations, employing an embodiment of the vehicle 10 described with reference to FIG. 1 operating on a roadway, including, by way of a non-limiting example, the road segment 200 that is described with reference to FIG. 2. The system includes a spatial sensor, a GPS sensor, a navigation system, and a controller. The spatial sensor is arranged to monitor a road segment of the roadway proximal to the vehicle. An on-vehicle memory device including a roadway map is also included. The controller is in communication with the spatial sensor, the GPS sensor, the navigation system, and the memory device. The controller includes an instruction set that is executable to determine, via the GPS sensor, a geographic position of the vehicle in context of the roadway map and monitor, via the spatial sensor, the road segment. A perceived point cloud including a sensed edge for the road segment based upon the spatial sensor and a mapped point cloud including a mapped edge for the road segment based upon the roadway map are determined. Overall, the perceived point cloud is assumed to be more accurate relative to ground truth than the mapped point cloud. The perceived point cloud is transformed onto the mapped point cloud, which means the mapped point cloud is fixed and the perceived point cloud is transformed as described with reference to a second routine that is described in FIG. 5.

An error vector is determined based upon a transformation between the mapped point cloud and the perceived point cloud, and a first confidence interval associated with the error vector is also determined. A second confidence interval associated with a longitudinal dimension based upon the mapped point cloud and the perceived point cloud is determined, and a third confidence interval associated with a lateral dimension based upon the mapped point cloud and the perceived point cloud is determined by a perturbed sensitivity analysis, as described herein. A Kalman filter analysis is executed to dynamically determine the position of the vehicle relative to the roadway map based upon the error vector, the first confidence interval, the second confidence interval, and the third confidence interval. Operation of the vehicle 10 is controlled based upon the position of the vehicle 10 relative to the roadway map 25. This is described with reference to FIGS. 3-7, as follows.

Figure 3:
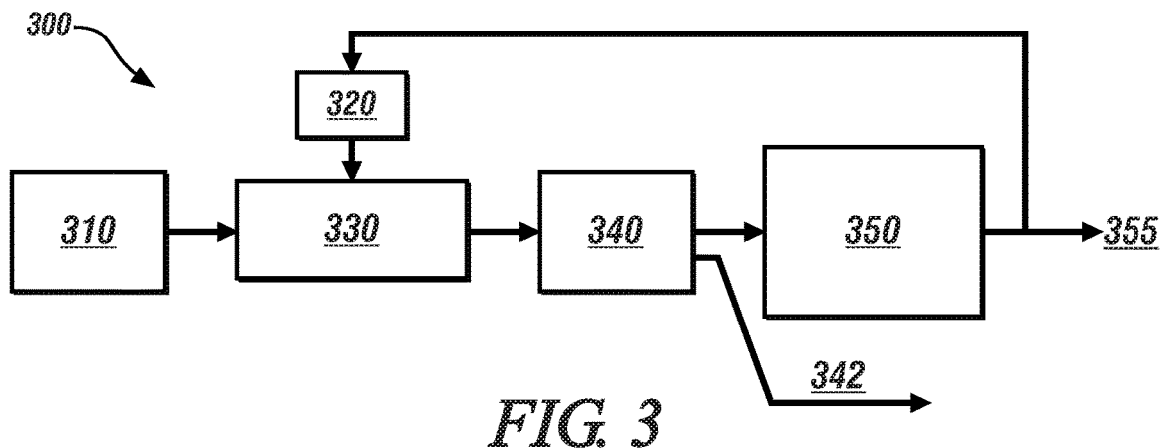
FIG. 3 schematically shows details related to a first portion of a control routine for dynamic on-vehicle evaluation of the accuracy of a road segment of a digitized roadway map and a process for updating the digitized roadway map, in accordance with the disclosure.

FIG. 3 schematically shows details related to a first routine 300 for dynamic on-vehicle evaluation of the accuracy of a road segment of a digitized roadway map to determine a first confidence interval associated with a transformation between the sensed edge for the road segment and the mapped edge for the road segment. The sensed edge for the road segment is represented as a perceived point cloud 310, and the mapped edge for the road segment is represented as a mapped point cloud 320. This includes employing a discounted distance iterative closest point (ICP) analysis of the mapped point cloud 320 and the perceived point cloud 310 in an unperturbed state, and querying a Gaussian process to determine the first confidence interval associated with the transformation between the sensed edge for the road segment and the mapped edge for the road segment. The routine 300 is described with reference to an embodiment of the vehicle 10 described with reference to FIG. 1, and an example of the road segment 200 that is described with reference to FIG. 2. The control routine 300 may be executed on-vehicle, such as by the spatial monitoring controller 110, the navigation system 24, or in a stand-alone controller.

Inputs to the first routine 300 include the perceived point cloud 310, which is analogous to the first set of points 210 associated with the road segment 200 that is described with reference to FIG. 2, and the mapped point cloud 320, which is analogous to the second set of points 220 associated with the road segment 200 that is described with reference to FIG. 2. The perceived point cloud 310 and the mapped point cloud 320 are input to a distance discounted iterative closest point (ICP) algorithm 330, which operates on the data in the perceived point cloud 310 and corresponding data in the mapped point cloud 320 to determine an unperturbed transformation vector 340. Implementation of ICP algorithms to determine a transformation between point clouds is understood in the art. The unperturbed transformation vector 340 may be captured in a database of map errors that is determined at a multitude of GPS coordinates. The database of map errors is employed in a Gaussian process composed from past observations to determine an error in a lane edge of the road segment and update the map based thereon, and may be stored in a memory device of the off-board server 95.

The unperturbed transformation vector 340 is output as error vector 355 that is associated with the perceived point cloud 310 representing the sensed edge for the road segment, and the mapped point cloud 320 representing the mapped edge for the road segment. The Gaussian process 350 is queried to determine the level of confidence in the observation. Thus, the outcome of the Gaussian process 350 includes the associated error vector 355 at a given GPS coordinate point based upon information in the database of map errors that is determined at the GPS coordinate. The error vector 355 is related to the transformation between the sensed edge, e.g., sensed edge 215, and a map edge, e.g., map edge 225 that are shown with reference to FIG. 2. The transformation may be quantified in the longitudinal direction (X) and the lateral direction (Y). The error vector 355 may be employed to update the digitized roadway map 25 that is employed by the navigation system 24 and the vehicle position. By way of a non-limiting example, this may include updating the map edge 225 of the road segment 200 that is shown with reference to FIG. 2.

The Gaussian process 350 is queried at each of the GPS coordinates to evaluate the unperturbed transformation vector 340 to determine the mean error observed at that location and its corresponding standard deviation. Using those values the unperturbed transform can be described by the number of standard deviations it is away from the mean in either direction and that information is used to state how likely it is that value will be observed. The farther it is away from the historically observed mean the less likely it is to occur and the less confidence in the sensor readings. The Gaussian process 350 can be N-dimensional in its implementation enabling it to capture different representations of error. Aspects of the Gaussian process 350 may be stored in a memory device of the off-board server 95.

Figure 4:
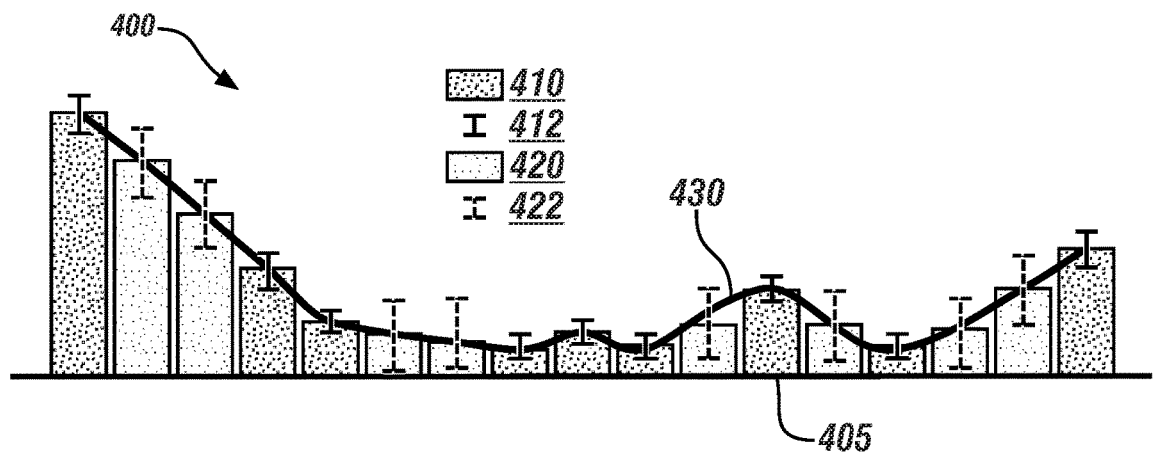
FIG. 4 graphically shows details related to a Gaussian analysis of data associated with a road segment of a digitized roadway map, in accordance with the disclosure.
Figure 6:
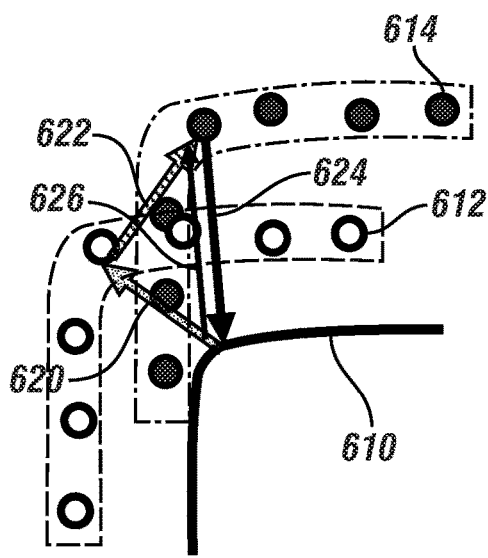
FIG. 6 pictorially shows details related to a perceived point cloud and a mapped point cloud associated with a road segment, in accordance with the disclosure.

FIG. 4 graphically shows data associated with execution of a Gaussian process 400, which includes the estimated magnitude of an error vector and associated confidence interval for a given GPS point. A first set of bars 410 represent a magnitude of the error vector from a reference line 405, e.g., a road edge, with associated error bars 412 indicative of uncertainty. A second set of bars 420 represent the magnitudes of the estimated error vectors from the reference line 405, with associated estimated error bars 422 indicative of uncertainty. Line 430 expresses the interpolated error, such that a GPS coordinate includes a mean historic error and a confidence interval, which can be reported.

Figure 5:
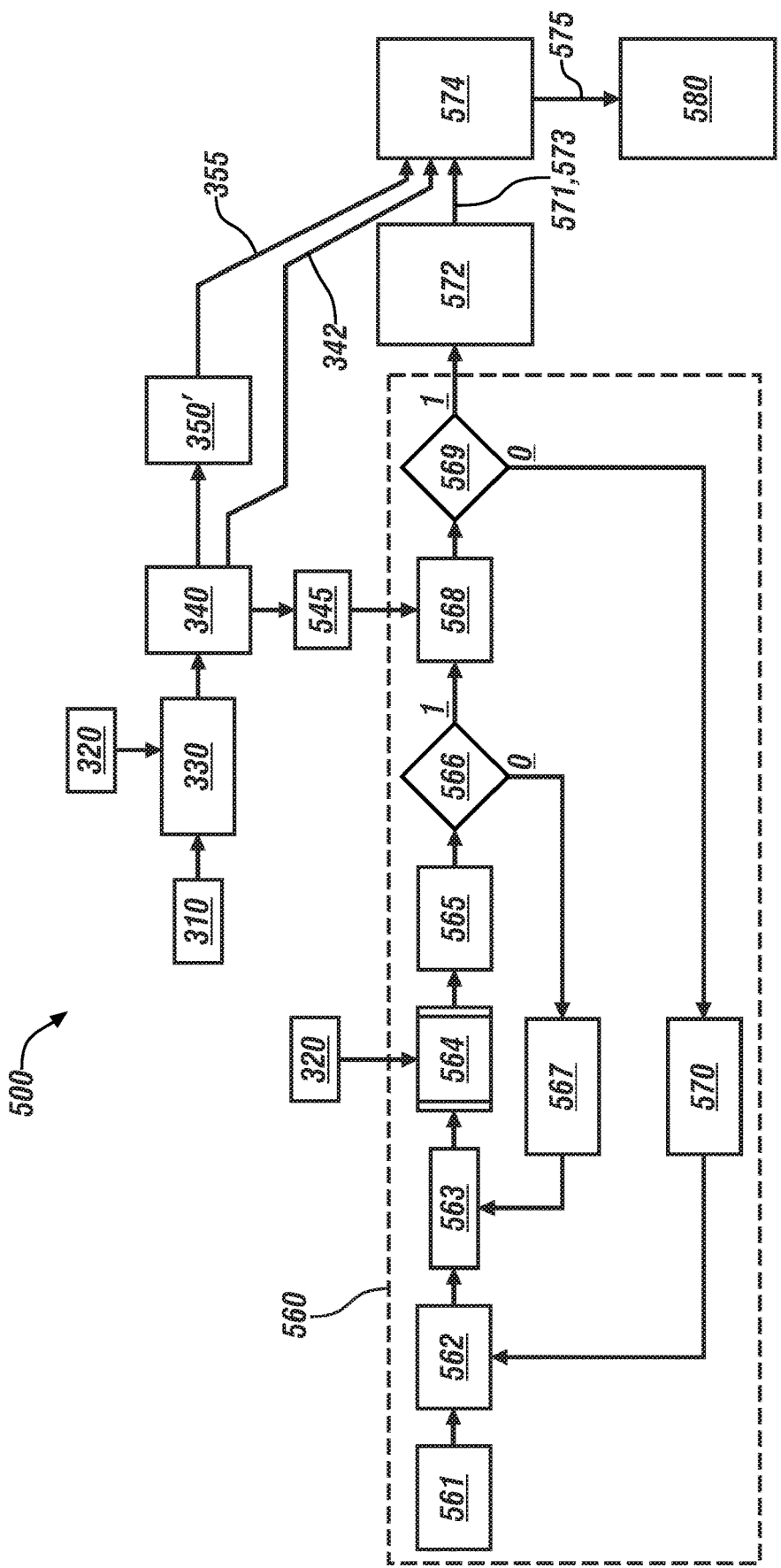
FIG. 5 schematically shows details related to a second portion of a control routine for dynamic on-vehicle evaluation of the accuracy of a road segment of a digitized roadway map, in accordance with the disclosure.

FIG. 5 schematically shows a second routine 500 for dynamic on-vehicle evaluation of the accuracy of a road segment of a digitized roadway. The second routine 500 includes a perturbed sensitivity analysis of a mapped point cloud and a perceived point cloud. In one embodiment, the perturbed sensitivity analysis includes a perturbed distance discount iterative closest point (ICP) analysis in the form of a second discounted distance iterative closest point (ICP) analysis of the mapped point cloud and the perceived point cloud. The perturbed sensitivity analysis includes inducing x-dimension perturbations of the perceived point cloud, and then inducing y-dimension perturbations of the perceived point cloud associated with the sensed edge for the road segment and the mapped edge for the road segment, and determining updated transforms between the sensed edge for the road segment and the mapped edge for the road segment, and an updated vehicle position in relation to the map.

The second routine 500 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 10 that is described with reference to FIG. 1.

TABLE 1

| BLOCK | BLOCK CONTENTS |
| --- | --- |
| 310 | Input Perceived point cloud $PC_p$ |
| 320 | Input Mapped point cloud $PC_m$ |
| 330 | Execute distance discounted ICP algorithm |
| 340 | Determine unperturbed transform |
| 545 | Rotate unperturbed transform 180° |
| 560 | Perturbed sensitivity analysis routine |
| 561 | Initialize j = 0 |
| 562 | Initialize i = 0 |
| 563 | Set $PC_p$ + $noise_i$ |
| 564 | Execute distance discounted ICP algorithm |
| 565 | Determine new $transform_i$ |
| 566 | Is i > 4? |
| 567 | Increment i |
| 568 | Determine Pearson Correlation Coefficient |
| 569 | Is j > 1? |
| 570 | Increment j |
| 572 | Return confidence interval in vehicle position in the longitudinal direction (X) and the lateral direction (Y). dimensions |
| 574 | Execute Kalman Filter |
| 580 | Update map |

Execution of the second routine 500 may proceed as follows. The steps of the second routine 500 may be executed in a suitable order, and are not limited to the order described with reference to FIG. 5. As employed herein, the term "1" indicates an answer in the affirmative, or "YES", and the term "0" indicates an answer in the negative, or "NO".

Inputs to the second routine 500 include the perceived point cloud 310, which is analogous to the first set of points 210 associated with the road segment 200 that is described with reference to FIG. 2, and the mapped point cloud 320, which is analogous to the second set of points 220 associated with the road segment 200 that is described with reference to FIG. 2.

The perceived point cloud 310 and the mapped point cloud 320 are input to the first distance discounted iterative closest point (ICP) algorithm (330) to determine the unperturbed transformation vector 340 between the sensed edge for the road segment and the mapped edge for the road segment, and an associated first confidence interval 342. The unperturbed transformation vector 340 may be expressed in the form of a vector that can be decomposed into a lateral error term, i.e., Ax and a longitudinal error term, i.e., Ay, between individual points of the perceived point cloud 310 and the mapped point cloud 320. A static form of the Gaussian process 350' is stored in the memory 23 of the vehicle 10. The static Gaussian process 350' is queried at each of the GPS coordinates to evaluate the unperturbed transformation vector 340 to determine the mean error observed at that location and its corresponding standard deviation. Using those values the unperturbed transform can be described by the number of standard deviations it is away from the mean in either direction. That information is used to state how likely it is that value will be observed. The farther it is away from the historically observed mean the less likely it is to occur and the less confidence in the sensor readings.

Figure 7:
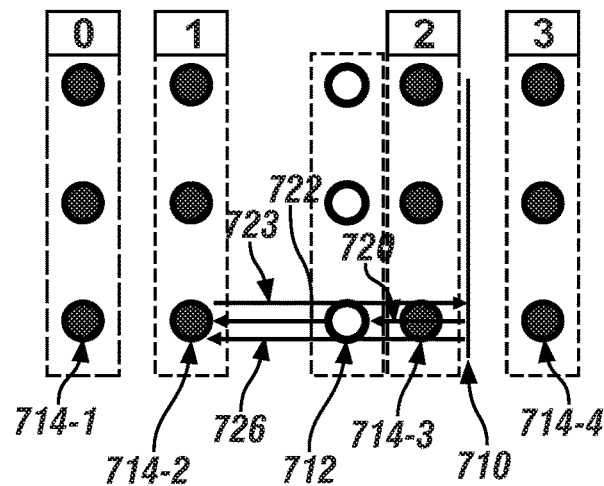
FIG. 7 pictorially shows details related to a perturbed sensitivity analysis of a mapped point cloud and a perceived point cloud, including x-dimension perturbations and associated vectors, in accordance with the disclosure.

The perceived point cloud 310 and the mapped point cloud 320 are also input to a perturbed sensitivity analysis routine 560. The perturbed sensitivity analysis routine 560 is an iterative process that operates by inducing a plurality of x-dimension perturbations into the perceived point cloud 310 (563), and executing an embodiment of the distance discounted ICP algorithm (564) to determine a plurality of x-transforms between the sensed edge for the road segment and the mapped edge for the road segment (565) based upon the x-dimension perturbations. FIG. 7 schematically shows examples of x-dimension perturbations and associated vectors. Line 710 depicts a ground truth in the form of an edge for a road segment, points 712 represent a perceived point cloud, and points 714-2 represent points of a mapped point cloud. Points 714-1, 714-3, and 714-4 represent the x-dimension perturbations into the perceived point cloud. Vector 720 represents an original transform, which has been rotated by 180°, vector 722 represents noise introduced by the perturbation, vector 723 represents a new transform, and vector 726 represents a combination of vectors 720 and 722, and is equal in magnitude to vector 723.

The perturbed sensitivity analysis routine 560 re-executes steps 562, 563, 564, 565, 566, 567 to induce a plurality of y-dimension perturbations and execute the distance discounted ICP algorithm (564) to determine a plurality of y-transforms between the sensed edge for the road segment and the mapped edge for the road segment (565) based upon the y-dimension perturbations, which has been subjected to a rotation of 180° (545). The y-dimension perturbations include adding noise solely in the y-dimension and have no bearing on the rotation of 180 degrees which is done so that when the vectors are added together the magnitude is comparable to vector 723. The distance discount ICP algorithm (564) operates to find a transformation between the perceived point cloud 310 and the mapped point cloud 320 by minimizing square errors therebetween by matching points, including a decreasing weight being attributed to points that are farther away from the spatial sensors. The perturbation entails shifting the perceived point cloud by a predetermined quantity in the x-dimension and the y-dimension, and executing the distance discounted ICP 564. When there is no difference between the transform for the perturbed point cloud and the unperturbed point cloud and the unperturbed point cloud's original transform rotated 180 degrees plus the noise vector, the point clouds are said to have information gain in that dimension and thus have a low uncertainty.

The transformation vector, also referred to as the error vector, will be computed using the iterative closest point algorithm modified to discount the weight of points which are further away from the sensor. This update to the minimization function is below. The error vector may be determined using based upon the following minimization relationship:

$$t = \arg\min \sum_{x_i, y_i \in C} \gamma^{|x_i|} \|d(x_i, y_i)\|^2 \quad [2]$$

wherein:
($x_i$, $y_i$) represents the perturbations into the x value and the y value for each of the elements of the perceived point cloud,
$\gamma = 0.95^{|x_i|}$, and
C represents a correspondence between a point in the perceived edge of the perceived point cloud 310 and the mapped edge of the mapped point cloud 320. A given point in the perceived point cloud 310 is said to correspond to the point in the mapped point cloud 320 that has the smallest Euclidean distance between the two points.

When the plurality of x-dimension perturbations have been induced and associated updated transforms have been determined, a Pearson correlation coefficient is executed (568) in accordance with EQ. 3, as follows:

$$r_{xy} = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}} \quad [3]$$

wherein:
$x_i = \|$rotated original transform+noise$\|_2$
$y_i = \|$New transform$\|_2$ The original transform is indicated by vector 620 in FIG. 6;
The rotated original transform is indicated by vector 626 in FIG. 6;
The noise is indicated by vector 622 in FIG. 6; and
The new transform is indicated by vector 624 in FIG. 6.

The Pearson correlation coefficient is executed for perturbations in the x-dimension and perturbations in the y-dimension in an iterative process, including steps 561, 562, 563, 564, 565, 566. The original transform in combination with added noise induced by the perturbations should be equal to the new transform when there is sufficient road shape information to find a ground truth and remove noise.

The comparison is achieved employing the Pearson correlation coefficient (EQ. 3), which equals 1 when there is perfect positive correlation. When the Pearson correlation coefficient approaches 0, it implies a lack of correlation between the induced noise and the discovered transformations.

The output of the perturbed sensitivity analysis routine 560 includes a second confidence interval 571 associated with the longitudinal direction based upon the mapped point cloud and the perceived point cloud, and a third confidence interval 573 associated with the lateral direction based upon the mapped point cloud and the perceived point cloud (572).

The first confidence interval 342 determined by the unperturbed transform 340, the error vector 355 associated with the Gaussian process 350, and the outputs of the perturbed sensitivity analysis routine 560 including the second confidence interval 571 associated with the longitudinal dimension and the third confidence interval 573 associated with the lateral dimension are provided as inputs to a Kalman filter 574 to dynamically determine a position of the vehicle 10 in relation to the map portion of the road segment in real-time.

The Kalman filter 574 executes to dynamically determine a position of the vehicle 10 (575) relative to the roadway map 200 based upon the error vector 355, the first confidence interval 342, the second confidence interval 571, and the third confidence interval 573.

The sensitivity analysis evaluates and estimates uncertainty in the output of a mathematical model in each dimension, i.e., in the lateral dimension and the longitudinal dimension, and divides and allocates the uncertainty to different sources of uncertainty in inputs.

The results of the Kalman filter 574 can be employed to dynamically update the position of the vehicle 10 (575) with regard to the roadway map in real-time based upon the final transform between the sensed edge for the road segment and the mapped edge for the road segment and the associated uncertainty (580). The overall result includes the roadway map being updated based upon the transformation between the sensed edge for the road segment and the mapped edge for the road segment and the associated uncertainty. Operation of the navigation system 24 can be based upon the updated roadway map for the road segment. When the vehicle 10 is equipped with some form of ADAS or other autonomous driving capability, the autonomous controller 65 is able to control a driving automation state associated with the ADAS, such as steering or braking, based upon the updated roadway map for the road segment. Operation of the vehicle 10, including the navigation system 24 and the autonomous controller 65, is enhanced based upon the updated roadway map for the road segment.

In order to reduce the complexity of the search space and allow for a higher fidelity match between the sensed edge 215 and the map edge 225, the distance discount ICP analysis 330 defines the scale of the sensed edge and the mapped edge to be 1 m to 1 m, thus negating a need to modify the scale of the sensed edge to match the scale of the mapped edge. The distance discount ICP analysis 330 also defines the sensed edge 215 in terms of offsets in the longitudinal direction (X) and the lateral direction (Y) from the map edge 225, with no rotation element about the axis of the vehicle 10. Experimentally this is shown to be better because low fidelity sensing far away from the spatial sensor leads to poor applications of rotation. Furthermore, empirical observations indicate that the farther away the data is from the sensor the lower the quality of the data. As such, information gain of points that are farther away from the vehicle 10 are discounted in the ICP minimization function. The lateral error term and the longitudinal error term represent map errors in the respective lateral and longitudinal dimensions.

Thus, the transformation 338 output from the distance discount ICP analysis 330 is used to develop an error metric that can be combined with the Gaussian process 350 to estimate errors at different points on the map to generate an improved confidence metric for the localization transform.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A system for a vehicle, comprising:
   a spatial sensor, a GPS sensor, a navigation system, a controller, and a memory device;
   wherein the memory device includes a digitized roadway map of a roadway;
   wherein the spatial sensor is arranged to monitor a road segment of the roadway;
   the controller, in communication with the spatial sensor, the GPS sensor, the navigation system, and the memory device, the controller including an instruction set, the instruction set executable to:
      determine, via the GPS sensor, a geographic position of the vehicle in context of the digitized roadway map;
      monitor, via the spatial sensor, the road segment;
      determine a perceived point cloud including a sensed edge for the road segment based upon a signal from the spatial sensor;
      determine a mapped point cloud including a mapped edge for the road segment based upon the digitized roadway map;
      determine an error vector based upon a transformation between the mapped point cloud and the perceived point cloud;
      determine a first confidence interval associated with the error vector;
      determine a second confidence interval associated with a longitudinal dimension based upon the mapped point cloud and the perceived point cloud;
      determine a third confidence interval associated with a lateral dimension based upon the mapped point cloud and the perceived point cloud;
      execute a Kalman filter analysis to dynamically determine a position of the vehicle relative to the digitized roadway map based upon the error vector, the first confidence interval, the second confidence interval, and the third confidence interval; and
      control operation of the vehicle based upon the position of the vehicle relative to the digitized roadway map.

2. The system of claim 1, wherein the instruction set is further executable to:
   execute a first discounted distance iterative closest point (ICP) analysis of the mapped point cloud and the perceived point cloud in an unperturbed state to determine the error vector between the mapped point cloud and the perceived point cloud for the road segment;
   determine the error vector based upon the error vector between the mapped point cloud and the perceived point cloud; and
   query a Gaussian process to determine the first confidence interval associated with the error vector.

3. The system of claim 1, wherein the instruction set is further executable to execute a perturbed sensitivity analysis of the mapped point cloud and the perceived point cloud to determine the second confidence interval associated with the longitudinal dimension based upon the mapped point cloud and the perceived point cloud and to determine the third confidence interval associated with the lateral dimension based upon the mapped point cloud and the perceived point cloud.

4. The system of claim 3, wherein the instruction set executable to execute the perturbed sensitivity analysis of the mapped point cloud and the perceived point cloud further comprises the instruction set being executable to induce an x-dimension perturbation of the perceived point cloud to determine the second confidence interval associated with the longitudinal dimension.

5. The system of claim 3, wherein the instruction set executable to execute the perturbed sensitivity analysis of the mapped point cloud and the perceived point cloud further comprises the instruction set being executable to induce a y-dimension perturbation of the perceived point cloud to determine the third confidence interval associated with the lateral dimension.

6. The system of claim 1, further comprising the instruction set being executable to update the digitized roadway map for the road segment based upon the error vector using a Gaussian Process that is comprised of past observations of error at a given location on the digitized roadway map.

7. The system of claim 1, wherein the spatial sensor comprises a digital camera that is arranged to monitor the road segment of the roadway proximal to and forward of the vehicle.

8. The system of claim 1, wherein the spatial sensor comprises one of a radar sensor or a lidar sensor that is arranged to monitor the road segment of the roadway proximal to and forward of the vehicle.

9. The system of claim 1, further comprising an advanced driver assistance system (ADAS), wherein the instruction set is executable to control a driving automation state associated with the ADAS based upon the position of the vehicle relative to the digitized roadway map.

10. A method for controlling a vehicle, wherein the vehicle includes a spatial sensor, a GPS sensor, a navigation system, and a controller, the method comprising:
   monitoring, via the spatial sensor, a road segment of a roadway on which the vehicle is operating;
   determining, via the GPS sensor, a geographic position of the vehicle in context of a digitized roadway map of the road segment;
   determining a perceived point cloud including a sensed edge for the road segment based upon the monitoring via the spatial sensor;

determining a mapped point cloud including a mapped edge for the road segment based upon the digitized roadway map;

determining an error vector based upon a transformation between the mapped point cloud and the perceived point cloud;

determining a first confidence interval associated with the error vector;

determining a second confidence interval associated with a longitudinal dimension based upon the mapped point cloud and the perceived point cloud;

determining a third confidence interval associated with a lateral dimension based upon the mapped point cloud and the perceived point cloud;

executing a Kalman filter analysis to dynamically determine a position of the vehicle relative to the digitized roadway map based upon the error vector, the first confidence interval, the second confidence interval, and the third confidence interval; and controlling operation of the vehicle based upon the position of the vehicle relative to the digitized roadway map.

11. The method of claim 10, further comprising:

executing a first discounted distance iterative closest point (ICP) analysis of the mapped point cloud and the perceived point cloud in an unperturbed state to determine the error vector between the mapped point cloud and the perceived point cloud for the road segment;

determining the error vector based upon the error vector between the mapped point cloud and the perceived point cloud; and querying a Gaussian process to determine the first confidence interval associated with the error vector.

12. The method of claim 10, further comprising executing a perturbed sensitivity analysis of the mapped point cloud and the perceived point cloud to determine the second confidence interval associated with the longitudinal dimension based upon the mapped point cloud and the perceived point cloud and to determine the third confidence interval associated with the lateral dimension based upon the mapped point cloud and the perceived point cloud.

13. The method of claim 12, wherein executing the perturbed sensitivity analysis of the mapped point cloud and the perceived point cloud comprises inducing an x-dimension perturbation of the perceived point cloud to determine the second confidence interval associated with the longitudinal dimension.

14. The method of claim 12, wherein executing the perturbed sensitivity analysis of the mapped point cloud and the perceived point cloud comprises inducing a y-dimension perturbation of the perceived point cloud to determine the third confidence interval associated with the lateral dimension.

15. The method of claim 10, further comprising updating the digitized roadway map for the road segment based upon the error vector, using a Gaussian Process that is comprised of past observations of error at a given location on the digitized roadway map.

16. The method of claim 10, wherein the spatial sensor comprises a digital camera that is arranged to monitor the road segment of the roadway proximal to and forward of the vehicle.

17. The method of claim 10, wherein the spatial sensor comprises one of a radar sensor or a lidar sensor that is arranged to monitor the road segment of the roadway proximal to and forward of the vehicle.

18. The method of claim 10, wherein the vehicle further comprises an advanced driver assistance system (ADAS), wherein the method further comprises controlling a driving automation state associated with the ADAS based upon the position of the vehicle relative to the digitized roadway map.

* * * * *